United States Patent [19]

Driscoll et al.

[11] Patent Number: 4,517,085
[45] Date of Patent: May 14, 1985

[54] FILTRATION DEVICES

[75] Inventors: Michael A. Driscoll, Bedford; James H. Edwards, Winchester, both of Mass.

[73] Assignee: Millipore Corporation, Bedford, Mass.

[21] Appl. No.: 532,733

[22] Filed: Sep. 15, 1983

[51] Int. Cl.³ ............................................. B01D 31/00
[52] U.S. Cl. .................................. 210/232; 210/433.2
[58] Field of Search ................. 210/232, 433.2, 321.1, 210/321.5; 285/53, 55, 260, 417

[56] References Cited

U.S. PATENT DOCUMENTS

| | | | |
|---|---|---|---|
| 3,605,725 | 9/1971 | Bentov | 285/95 |
| 3,880,755 | 4/1975 | Thomas et al. | 210/232 |
| 3,928,204 | 12/1975 | Thomas | 210/232 |
| 4,237,010 | 12/1980 | Zimmerly | 285/95 |
| 4,257,894 | 3/1981 | Barney | 210/232 |
| 4,296,951 | 10/1981 | Zimmerly | 285/95 |
| 4,346,004 | 8/1982 | Foucras et al. | 210/232 |

Primary Examiner—Frank Spear
Attorney, Agent, or Firm—Andrew T. Karnakis

[57] ABSTRACT

An interconnector 22 for filtration modules 18 which have axially extending tubes 90. The interconnector 22 is a rigid tubular member having conical tapered portion 88 at opposite ends to join fluid tight connections with the filtration modules.

8 Claims, 10 Drawing Figures

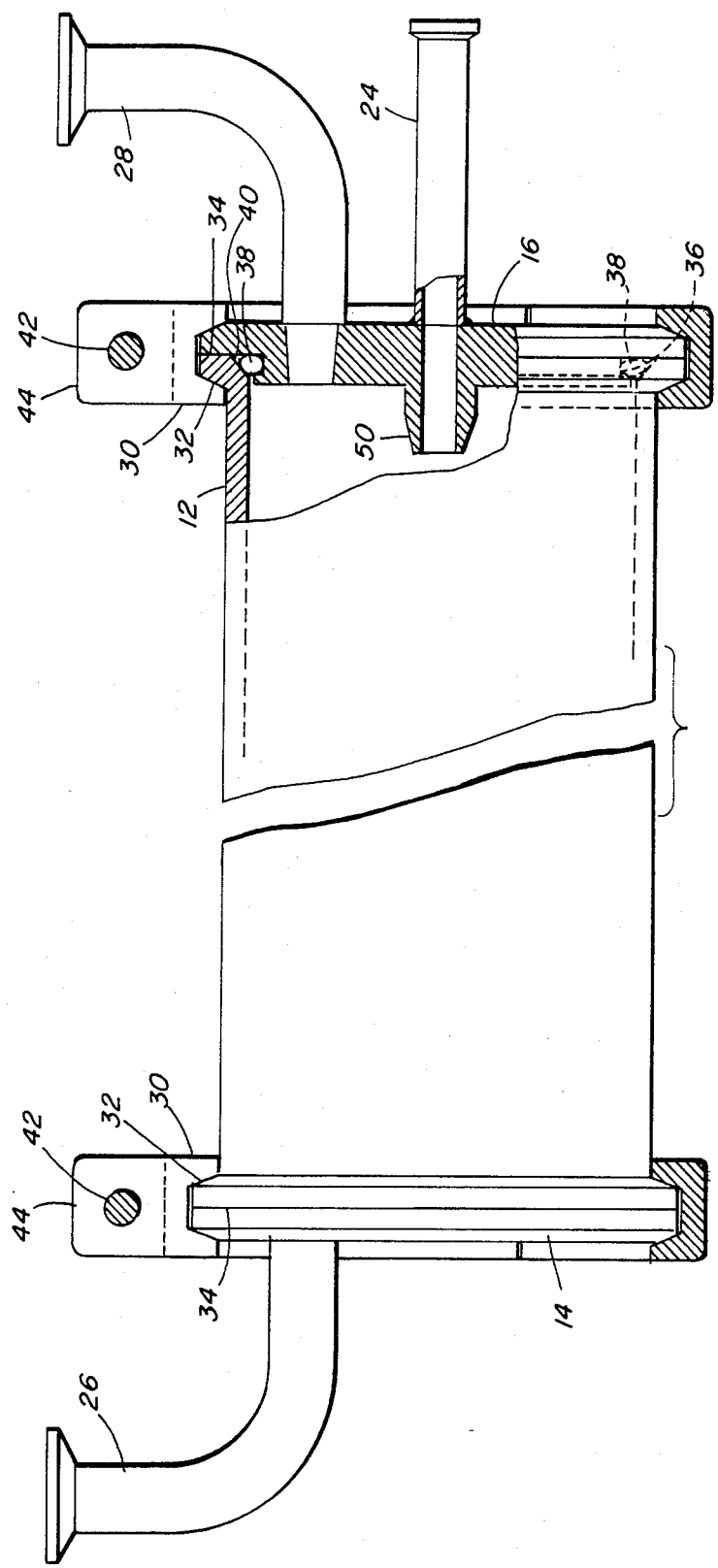

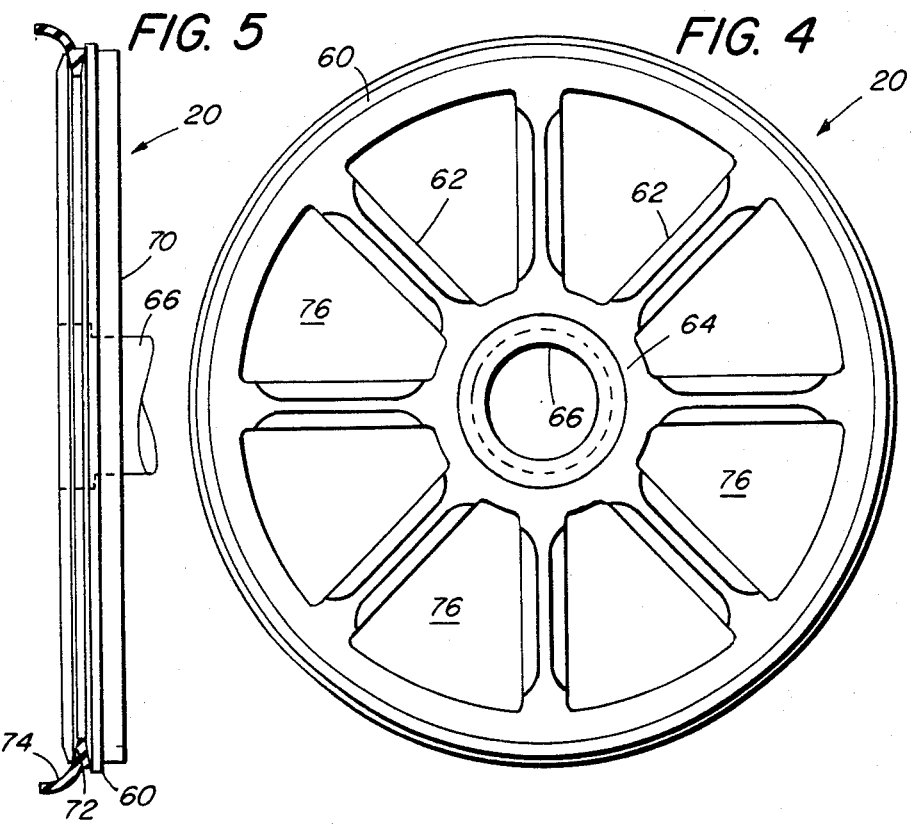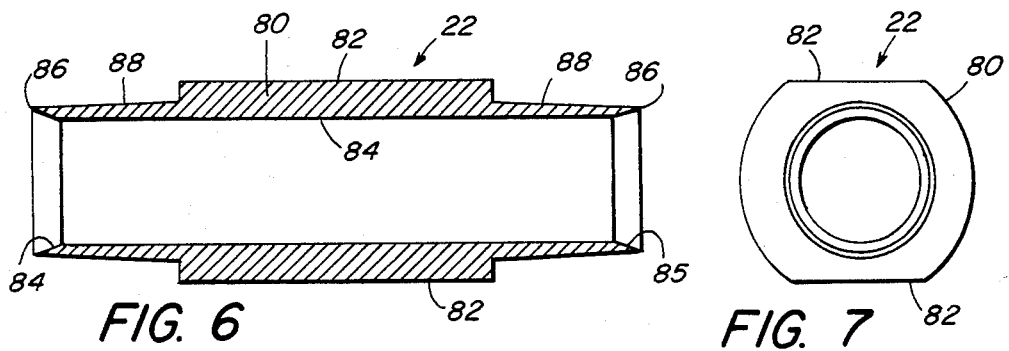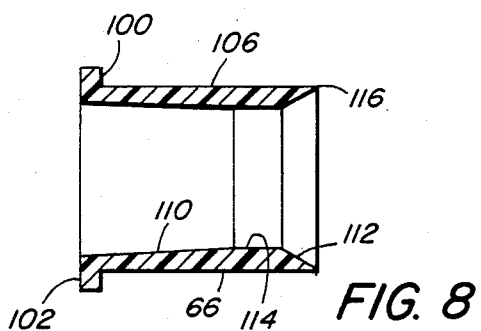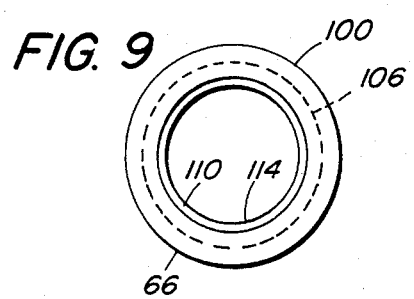

FILTRATION DEVICES

DESCRIPTION

1. Field of the Invention

This invention relates to filtration apparatus employing membrane separation devices and more particularly relates to mechanism which utilizes axially arranged filtration modules.

2. Background Art

Filtration apparatus today often employs filtration modules comprising membranes spirally wound on filtrate tubes. This type of filter has been used successfully in producing from impure solutions, extremely pure filtrates, for example, desalinated and purified water and more particularly pharmaceutically pure water. An impure solution for the purposes of this invention is any solution which undergoes the filtration process even though the so-called impure solution is, for example, water which is known safe for humans to drink.

The solution is forced under pressure through a semipermeable membrane which is the heart of the filtration module. The membranes within the filter vary in accordance with the particular solution to be filtered. The porosity of the membrane is selected as a function of the molecular weight or particle size within the impure solution. The present invention will be illustrated with reference to the production of pharmaceutically pure water from ordinary drinking water.

The membranes are sheets secured to and spirally wound on the exterior of a central filtrate tube. The tube has a number of small radially extending holes communicating with the spirally wound filter membrane. The unfiltered fluid is forced under pressure through the membrane and radially into the filtrate tube. A number of such modules are aligned within a cylindrical pressure vessel in series with their filtrate tubes connected to form a central collection tube or conduit for directing the filtrate out of the apparatus. This basic type of apparatus is disclosed in U.S. Pat. No. 3,880,755 to Thomas et al.

Spirally wound membranes have a tendency to swell with use and to move axially of their inner filtrate tubes resulting in a telescoping effect with the ends of the modules becoming slightly conical in shape. For this reason consecutive filter modules are not placed in abutting relationship with one another since the cumulative effect of the telescoping would destroy the modules particularly at the ends of the filtration apparatus.

To prevent the problem, retaining plates are provided which abut the spirally wound membranes restricting their axial movement and thus preventing telescoping. The retaining plates are often circular with flat faces engaging the filter membranes. They are constructed with holes through which the concentrate passes from one module to another. Some of these retaining plates resemble spoked wheels with its hub includes a hole which constitutes part of the filtrate passageway. The rim is an annular ring engagable with the face of the filter module at its periphery and the spokes which radiate from the hub to the rim are pressure members also engagable by the ends of the filter modules to prevent telescoping. The filtrate connecting tubes which are the cores of the modules must be joined together by interconnectors in the spaces between modules. However, problems can occur here. First, since they contain unfiltered or impure fluid, the joints between the interconnectors and the modules must be fluid tight and strong enough to resist distortion caused by hydraulic shock when the fluid pressure in the apparatus is turned on and off.

These and other areas which restrict fluid flow can also in certain installations encourage the development of bacterial growth.

Thirdly, interconnectors themselves have been a source of leakage because they are under high pressure. When made of rubber or other flexible material or composite rubber and metal materials, they have become distorted and lose their sealing effectiveness.

U.S. Pat. No. 3,928,204 discloses composite interconnectors (metal and rubber) and which employ a resilient washer interposed between adjoining ends of tubes which project into the interconnectors. This is said to absorb hydraulic shock which normally occurs when flow directions are reversed in filtration units including spirally wound modules.

Subsequently U.S. Pat. No. 4,237,010 disclosed an interconnector constructed entirely of rubber. It has an outer portion of a durometer to withstand impact shocks and to provide a washer which projects inwardly to abut the axially extending tubes of the filtration module. The inner portion is also made of rubber, of a lower durometer in order to take advantage of its sealing characteristics with the permeate tubes of the modules.

As the art evolved, various other interconnector means came into existence. Some of these employ interconnector plugs which are in the form of tubes having on each end smaller projecting tubes which entered the filtrate tubes of adjacent modules and are sealed by O-rings.

Interconnector devices relying on O-rings suffer not only from the impact of hydraulic shock which tends to distort the O-rings but also produce dead volume areas along the filtrate tube passageway which results in non-flowing fluids. This is to be avoided.

Subsequently U.S. Pat. No. 4,296,951 was directed to a molded elastomeric spherical body which has coaxial bores for receiving the ends of the filtrate tubes. In other words, it employed a flexible rubber ball into which the end tubes were positioned.

These interconnectors rely upon elastomeric material creating a seal. However, elastomeric material is subject to distortion of both a temporary and a permanent nature reducing its reliability as a seal.

DISCLOSURE OF THE INVENTION

The invention is embodied in a filtration apparatus which includes a pressure vessel in which there are a plurality of filtration modules serially arranged. Each module has a filtration membrane wound around a filtrate collection tube. There are retaining means secured to each collection tube which are engagable with the filtration membrane to prevent telescoping. Means connect adjacent filtration modules and comprise a symmetrical tubular, member having conical, tapered portions at its opposite ends to form fluid tight connections with the filtration modules.

The above and other features of the invention including various novel details of construction and combinations of parts will now be more particularly described with reference to the accompanying drawings and pointed out in the claims. It will be understood that the particular ultra filtration devices embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 2 is a side elevation of the pressure vessel with parts broken away and shown in section.

FIG. 4 is a front elevation view of a membrane retaining plate.

FIG. 5 is an edge view thereof.

FIG. 6 is a sectional view of the interconnecting means.

FIG. 7 is an end view thereof.

FIG. 8 is a sectional view of a boss which mates with the interconnector.

FIG. 9 is an end view thereof.

BEST MODE OF THE INVENTION

Figures 1, 10:
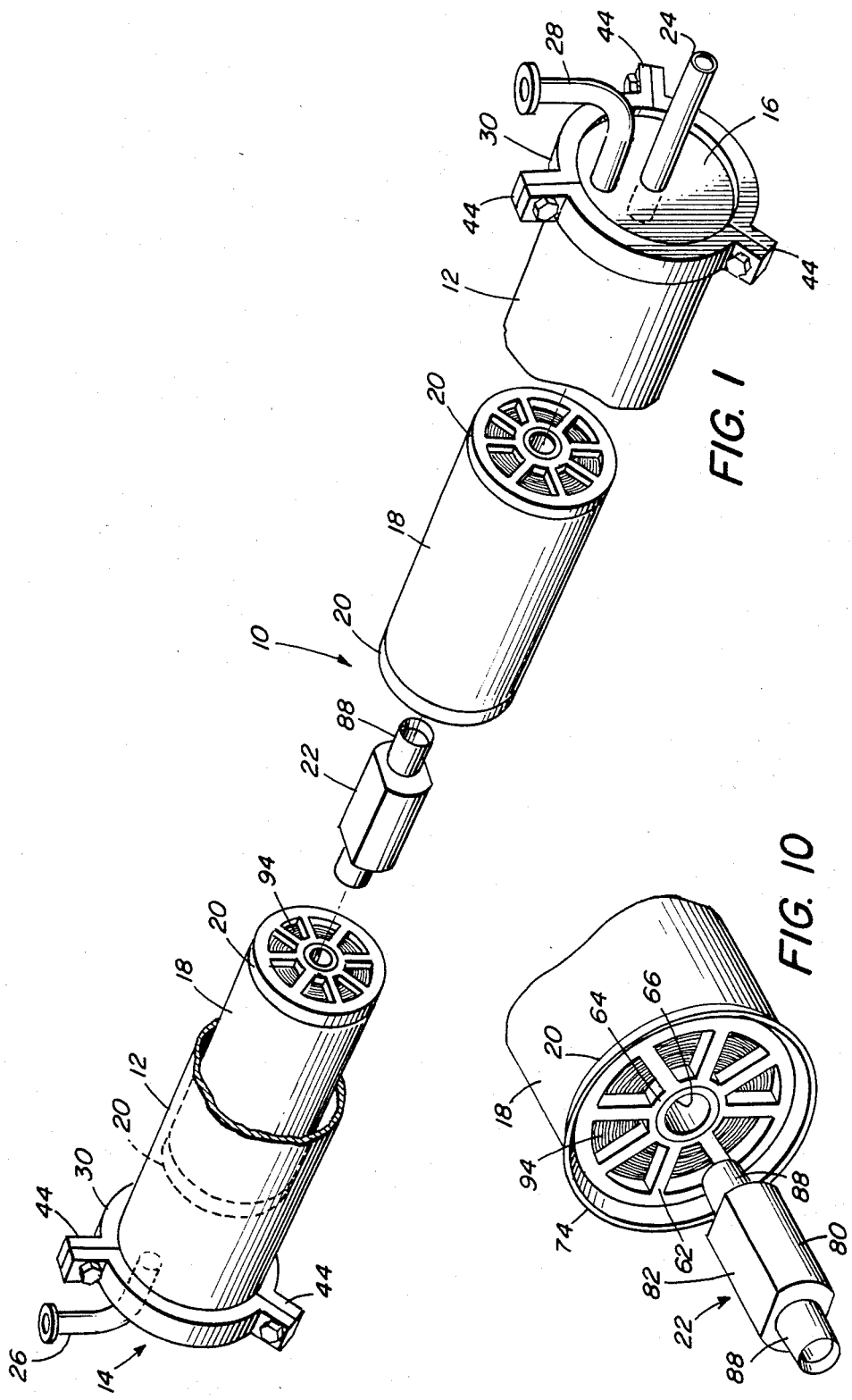
FIG. 1 is a perspective exploded view of a filtration device embodying the principles of the invention.
FIG. 10 is a perspective exploded view of the interconnector and a portion of a filtration module.

Referring to FIG. 1 there will be seen filtering mechanism 10 for performing filtration by the technique of membrane separation. The mechanism comprises a hollow cylindrical pressure vessel 12 closed at one end by an entrance end plate 14 which, although obscured in FIG. 1, is located at the upper left hand of the figure. The opposite end is closed by an outlet-end plate 16. A number of spirally wound, serially aligned filtration modules 18 are located within the pressure vessel 12. For simplicity of illustration, only two modules are shown, but any number may be contained within a pressure vessel.

Each module 18 has on its opposite ends retainers or anti-telescoping plates 20. Adjacent pairs of modules are connected by a solid one piece interconnector 22. The last module 18b connects with a filtrate discharge pipe 24. The impure solution or unfiltered liquid enters the under pressure through an inlet pipe 26 and that impure solution which is not filtered in one pass is returned to pumping mechanism (not shown) through an outlet pipe 28 with the filtrate passing to collecting means through the filtrate discharge pipe 24. The entrance end plate 14 and the exit end plate 16 are firmly clamped to the pressure vessel 12 by split ring clamping collars 30.

Referring to FIG. 2, the end plates 14 and 16 will be seen in greater detail. The ends of the pressure vessel 12 are flanged outwardly as at 32. Plates 14 and 16 are of the same diameter as the flanged portions 32 and each have flat annular mating surfaces 34. Located in grooves 36 in the end plates are compressible annular washers 38 which engage beveled surfaces 40 in the flanges. Clamping rings 30 in the form of annular channel sections engage firmly both the flanges 32 and the corresponding surfaces of the end plates, to compress the washers 38. Clamping pressure is supplied by bolts 42 in outstanding lugs 44.

The impure solution inlet pipe 26 and the outlet piper 28 are welded to the inlet plate 14 and the outlet plate 16 respectively at points radially outward of their center. The filtrate discharge tube 24 is welded to the outside of the discharge plate 16 at its center. On the inner side of the plate 16 and in fluid communication with the tube 24 is a boss 50 which will be described in more detail hereinafter.

The filter retainer or anti-telescoping device is made of polysulphone and is best seen in FIGS. 4 and 5. These members closely resemble a spoked wheel have a rim portion 60, spokes 62 and a hub 64. The center of the hub is bored to receive a boss 66 also seen in FIGS. 8 and 9. The hub 64, the spokes 62 and the rim 60 are coplanar and create a filter engaging surface 70. (FIG. 5) This surface abuts the actual spirally wound filter membrane to prevent telescoping.

The periphery of the rim 60 is grooved to receive a flexible optional lip seal 74. The purpose of the lip seal 74 is to direct impure solution in general inwardly to pass through the openings 76 between spokes to enter the filter membrane rather than pass outwardly of the module 18 in the space 78 (FIG. 3) between the module 18 and the pressure vessel 12. There are times, however, when it is desirable to use only a partial seal and have some of the unfiltered material pass around the outside of the module to prevent formation of pockets or dead spaces of unfiltered material, particularly if the material is of a type which will biologically deteriorate with time. However, the lip seal is optional and forms no part of this invention.

Figure 3:
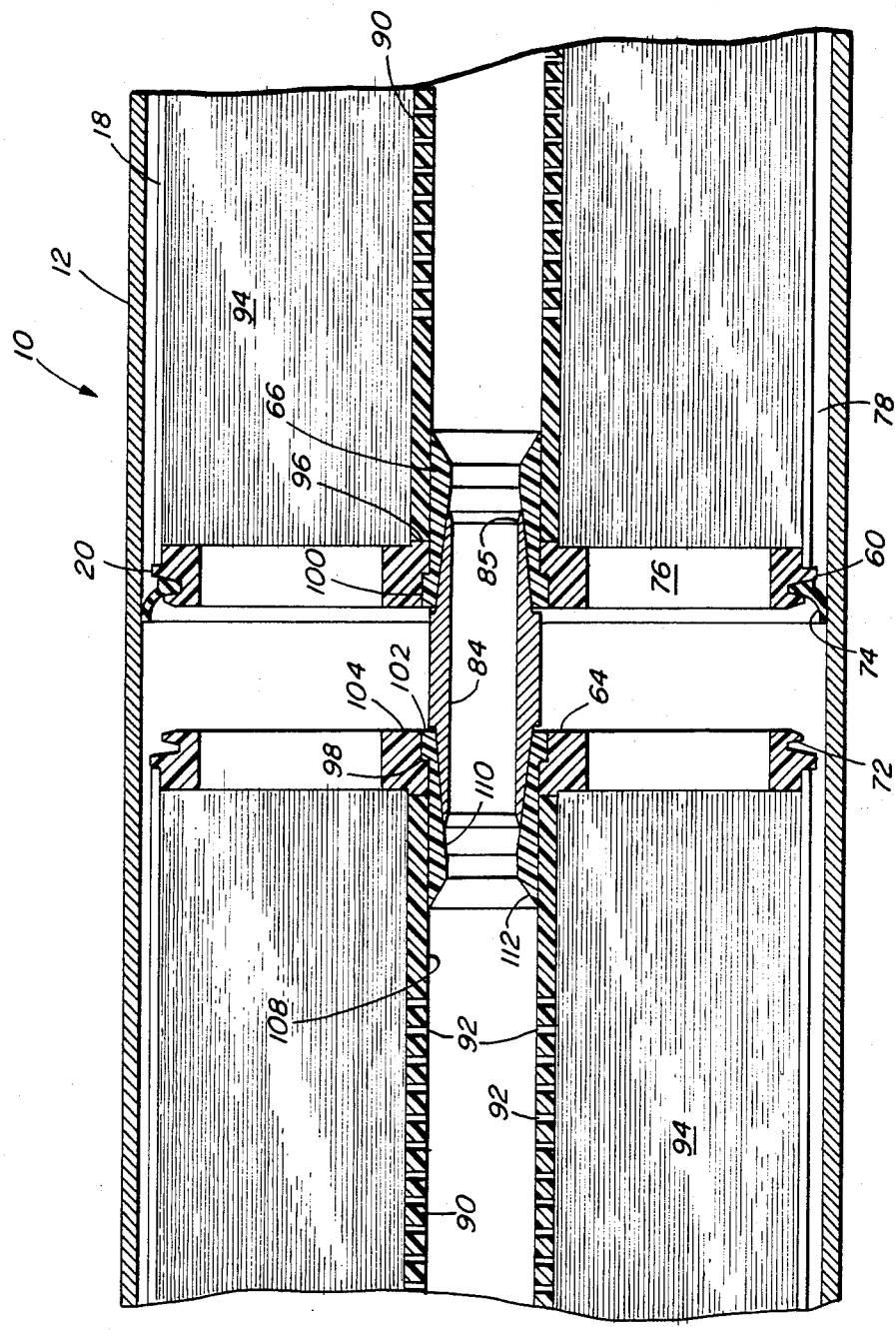
FIG. 3 is a sectional elevation view of an interconnector and portions of two adjacent filtration modules.

The interconnector 22 and its relationship to the modules 18 will now be described with reference to FIG. 3 and FIGS. 6 and 7. The interconnector 22 is a solid, one piece, rigid, symmetrical substantially inelastic material such as metal or high density plastic. It has a hub portion 80 and parallel opposed external flats 82 which makes it readily engagable by a wrench or other gripping means for insertion and removal into the filter module. It has a continuous smooth central bore 83 with chamfered or counterbored end portions 84, 85 which form circular intersections 86 with outer conical tapered male portion 88. As seen in FIG. 3 the filter modules 18 are comprised of a core forming a solid, hard filtrate collecting tube 90 made of, for example, polysulphone. A plurality of radially extending holes 92 in the tube 90 place the interior of the tube in communication with the membrane material 94 of the filter modules.

The anti-telescoping plates 20 (one of which is at each end of the membrane material 94) is solvent bonded at 96 to the filtrate tube 90. It is also counterbored at 98 to accept the boss 66 which has an annular rib 100 that fits within the counterbore 98. The plug 66 made of solid hard material as for example polysulphone is solvent bonded in the hub 64 of the retainer plate 20. A flat face 102 on the boss 66 is continuous with the flat outer face 104 of the hub 64.

The inner portion of the boss 66 contains a tapered conical female surface 110 which is of the same taper as the tapered conical male surface 88 of the interconnector 20. An annular female taper 112 at the end of the boss 66 makes circular contact with its outer diameter 106. When assembled, the annular taper 112 of the boss forms an acute angle with the inner diameter 108 of the filtrate tube as does the annular tapers 84–85 of the interconnector 22 with the tapered surface 110 of the boss 66. This aids in a smooth, unrestricted flow of fluid through the filtrate tube 90, the boss 66, the interconnector 22 and into the next filtrate tube.

The filtrate tube 90 and the layers of semipermeable membrane material 94 spirally wound on it are trimmed. The bosses 66 and the anti-telescoping ends 20 are bonded together and to the tube. This assembly, in effect, forms a spool that supports the membrane layer.

The boss 66 in the first retainer plate 20 is plugged or it is made solid.

Impure solution is forced under pressure into the spaces 76 between the spokes 62 of the retainers 20 into the filtrate membrane material 94 and, as a filtrate, through the holes 92 into the filtrate tubes 90. Thence the filtrate flows along the tubes in a direction from left to right as viewed in the drawings through each interconnector 22 to the next module lastly out through the filtrate tube 24.

The interconnectors are not permanently attached to the modules but are assembled by force fit therein. The included conical angle of the male tapered portions 88 of the interconnectors 22 as well as the tapered female conical portions 110 of the bosses 66 are less than eight degrees and produce a locking connection at each juncture between a module and an interconnector. With all elements assembled locking fluid tight relationship as the impure solution enters the pressure vessel 12 from the top left as viewed in FIG. 1, it creates force in the direction urging the trailing end of the first module into locking fluid-tight connection with the leading end of the first interconnector 22. In turn the force urges the trailing end of the interconnector toward the leading end of the second module again assuring a fluid-tight force fit. In turn, this continues in the downstream direction until the last module is forced against the boss 50 formed on the end plate 16. The boss 50 is the equivalent of the tapered male portion 88 of an interconnector also having a male conical taper of less than seven degrees. It mates with the female conical taper 110 of the boss 66 last retainer 20.

Because of the absence of elastomeric material in the interconnector, there is no distortion caused by fluid impact or chance of impure solution leaking into the filtrate tubes is eliminated.

Because of the simplicity of construction, the modules may be readily removed for cleaning or replacement simply by separating them from the interconnectors with which they were assembled in forcefit relationship.

We claim:

1. A removal interconnector for joining filtration modules which have axially extending tubes,
    said interconnector comprising a rigid tubular member having conical externally tapered portions at opposite ends to form fluid tight connections with the inner diameters of the tubes of two adjacent filtration modules when the interconnector is inserted into the tubes,
    the open ends of the tubular interconnector being chamfered internally and forming an acute angle and a linear anular intersection with the inner diameters of the filtrate tubes to permit an unrestricted flow of fluid between two adjacent filtration modules.

2. The interconnector of claim 1 in which the conical externally tapered portions are formed with an included angle of less than eight degrees.

3. The interconnector of claim 1 in which there are parallel external flats between the conical externally tapered portions to facilitate insertion into and removal from the tubes of the modules.

4. The interconnector of claim 1 being formed of a solid substantially inelastic material.

5. A filtration apparatus comprising:
    a pressure vessel,
    a plurality of spiral wound filtration modules serially arranged within the vessel,
    each module including a filtration membrane wound around a filtrate collection tube having conical internally tapered portions at each end,
    retaining means secured to each collection tube and engageable with the filtration membrane, and
    means for removably connecting adjacent filtration modules comprising,
    an interconnector comprising a rigid tubular member having conical externally tapered portions at opposite ends to form fluid tight connections with the conical internally tapered portions of the tubes of two adjacent filtration modules when the interconnector is inserted into the tubes,
    the open ends of the tubular interconnector being chamfered internally and forming an acute angle and a linear anular intersection with the internally tapered portions of the filtrate tubes to permit an unrestricted flow of fluid between two adjacent filtration modules.

6. The interconnecting means of claim 5 in which the interconnector is formed of a solid, substantially ineslastic material.

7. The apparatus of claim 5 in which the conical externally tapered portions are formed with an included angle of less than eight degrees.

8. The apparatus of claim 5 in which the removable interconnector is formed of a solid, substantially inelastic material.

* * * * *